(12) United States Patent
Balmer et al.

(10) Patent No.: US 12,248,280 B2
(45) Date of Patent: Mar. 11, 2025

(54) MOTOR GROUP FOR WATCHES

(71) Applicant: ETA SA Manufacture Horlogere Suisse, Grenchen (CH)

(72) Inventors: Raphael Balmer, Vicques (CH); Pascal Lagorgette, Bienne (CH)

(73) Assignee: ETA SA Manufacture Horlogere Suisse, Grenchen (CH)

( * ) Notice: Subject to any disclaimer, the term of this patent is extended or adjusted under 35 U.S.C. 154(b) by 0 days.

(21) Appl. No.: 16/592,469

(22) Filed: Oct. 3, 2019

(65) Prior Publication Data
US 2020/0033810 A1 Jan. 30, 2020

Related U.S. Application Data

(62) Division of application No. 15/468,663, filed on Mar. 24, 2017, now Pat. No. 10,545,460.

(30) Foreign Application Priority Data

Apr. 13, 2016 (EP) ..................................... 16164991

(51) Int. Cl.
*G04C 3/14* (2006.01)
*G04B 13/02* (2006.01)
(Continued)

(52) U.S. Cl.
CPC ............. *G04C 3/146* (2013.01); *G04B 13/02* (2013.01); *G04B 29/04* (2013.01); *G04C 3/00* (2013.01);
(Continued)

(58) Field of Classification Search
CPC .......... G04C 3/146; G04C 3/14; G04C 13/02; G04C 13/00; G04C 3/008; G04C 3/16;
(Continued)

(56) References Cited

U.S. PATENT DOCUMENTS

| | | | |
|---|---|---|---|
| 3,916,614 A * | 11/1975 | Takatsuki | G04B 19/02 368/300 |
| 4,233,680 A | 11/1980 | Sudler | |

(Continued)

FOREIGN PATENT DOCUMENTS

| | | |
|---|---|---|
| CN | 1379297 A | 11/2002 |
| CN | 103293936 A | 9/2013 |

(Continued)

OTHER PUBLICATIONS

European Search Report issued Oct. 6, 2016 in European Application 16164991.8, filed on Apr. 13, 2016 (with English Translation of Categories of cited documents).

(Continued)

*Primary Examiner* — Edwin A. Leon
(74) *Attorney, Agent, or Firm* — Oblon, McClelland, Maier & Neustadt, L.L.P.

(57) ABSTRACT

A motor group including motor modules, each including a motor device driving a display wheel set, with a center pipe fixed on a plate, including a device for rotational guiding, about a main axis, of a display wheel set internal or external to the center pipe, this module includes an axial stop arranged to limit to a predetermined value the axial play in the direction of the main axis between the center pipe and the display wheel set, wherein a protruding surface of the center pipe or of the display wheel set, or an added axial stop, captively mounted between the center pipe and the display wheel set, or fixed to the display wheel set.

11 Claims, 16 Drawing Sheets

(51) Int. Cl.
  *G04B 19/02* (2006.01)
  *G04B 19/04* (2006.01)
  *G04B 29/04* (2006.01)
  *G04B 33/06* (2006.01)
  *G04B 35/00* (2006.01)
  *G04C 3/00* (2006.01)
  *H02K 37/24* (2006.01)

(52) U.S. Cl.
  CPC .............. *G04C 3/14* (2013.01); *H02K 37/24* (2013.01); *G04B 19/02* (2013.01); *G04B 19/04* (2013.01); *G04B 33/06* (2013.01); *G04B 35/00* (2013.01)

(58) Field of Classification Search
  CPC ........ G04B 19/04; G04B 29/04; G04B 19/02; G04B 35/00; H02K 37/24; H02P 8/02
  See application file for complete search history.

(56) References Cited

U.S. PATENT DOCUMENTS

| | | | |
|---|---|---|---|
| 4,465,378 A | 8/1984 | Maurer et al. | |
| 4,465,381 A * | 8/1984 | Cleusix | G04C 21/16 368/254 |
| 5,155,712 A * | 10/1992 | Mose | G04B 13/023 368/190 |
| 8,023,364 B2 * | 9/2011 | Kojima | G04C 3/14 368/220 |
| 8,740,452 B2 | 6/2014 | Kaelin | |
| 2002/0141292 A1 * | 10/2002 | Bettelini | G04B 13/02 368/323 |
| 2013/0044574 A1 | 2/2013 | Kaelin et al. | |
| 2014/0362671 A1 | 12/2014 | Lagorgette | |
| 2015/0078145 A1 | 3/2015 | Wyssbrod | |

FOREIGN PATENT DOCUMENTS

| | | |
|---|---|---|
| EP | 3 070 538 A1 | 9/2016 |
| FR | 2 518 775 | 6/1983 |
| JP | 2013-40942 | 2/2013 |
| WO | WO 03/055054 A1 | 7/2003 |
| WO | WO 2013/127686 A1 | 9/2013 |

OTHER PUBLICATIONS

Combined Taiwanese Office Action and Search Report issued Aug. 19, 2021 in Taiwanese Patent Application No. 106109207 (with English translation), 18 pages.

* cited by examiner

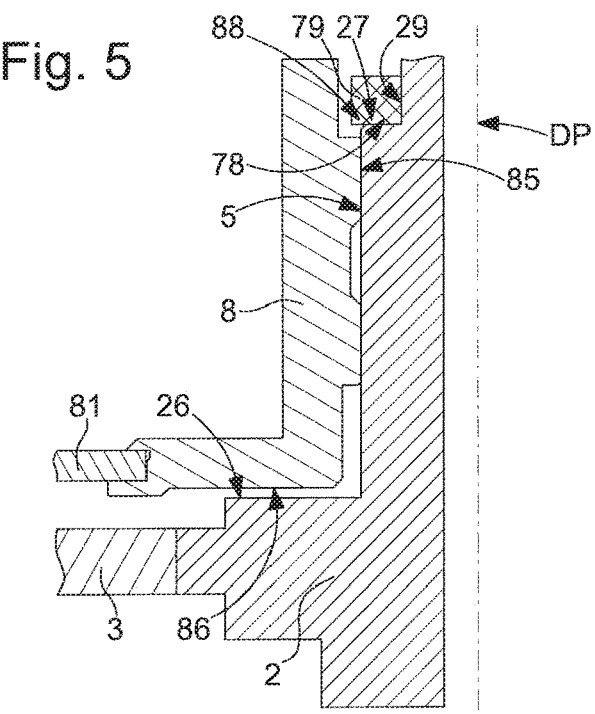
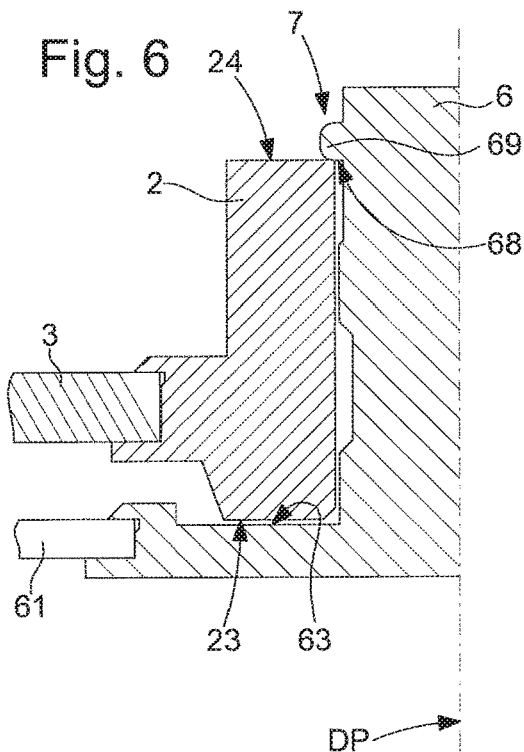
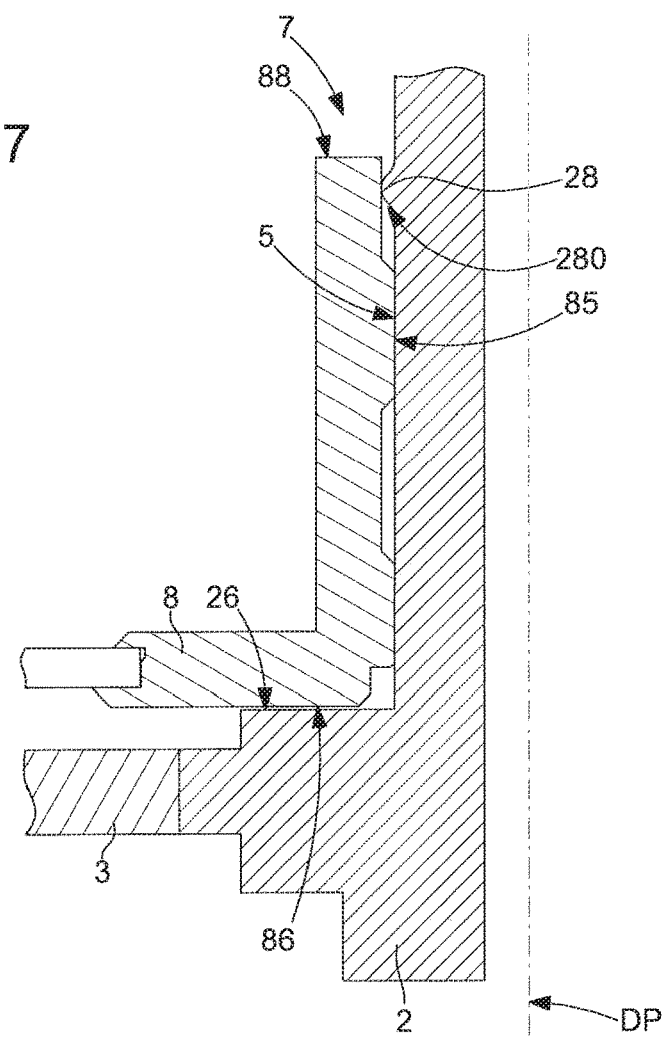

MOTOR GROUP FOR WATCHES

CONTINUITY AND CROSS REFERENCE TO RELATED APPLICATIONS

This application is a divisional application of U.S. patent application Ser. No. 15/468,663 filed Mar. 24, 2017, which claims priority from European Patent application 16164991.8 filed Apr. 13, 2016, the disclosures of which is are hereby incorporated herein by reference, in entirety.

FIELD OF THE INVENTION

The invention concerns a motor group for watches, comprising a plurality of motor modules, each comprising a plate arranged for securing said module to a timepiece movement, and each comprising motor means arranged for driving at least one display wheel set.

The invention also concerns a timepiece movement including at least one such motor group.

The invention also concerns a watch including such a motorization group.

The invention mainly concerns the field of displays for watches, in particular watches with a flat movement, and for watches with electromechanical or electronic movements.

BACKGROUND OF THE INVENTION

For a watch manufacturer, it is advantageous to handle the smallest possible number of different components for economic reasons. This particularly concerns display mechanisms, which generally incorporate a wide variety of components.

These display components are generally guided on two structural elements: a plate, and a bar that ensures the pivoting of the wheel sets. For example, in the case of a center-seconds wheel, currently there is always a central bar which provides the pivoting of the center-seconds wheel beneath the center pipe inside which the center-seconds wheel pivots.

JP Patent No 2013 040942 in the name of ETA SA Manufacture Horlogère Suisse discloses a timepiece subassembly including a spacer for guiding a pivoting wheel set on a bottom plate with a shoulder cooperating with a housing therein, and a stop surface abutting against the bottom plate. It includes a drive means secured to the wheel set, which slides with respect to the spacer, with an axial shake, determined between two stop positions, one against the collar of the wheel set and a front end face of the spacer, and the other between a stop surface of the drive means and a rear end face of the spacer. This wheel set includes, on the other side of the collar relative to the drive means, a machined portion cooperating with a complementary machined portion comprised in a display element for securing the element to wheel set.

EP Patent Application No 3070538A1 in the name of NOGERAH SA discloses a display mechanism, for a timepiece movement, comprising a first display wheel set carrying a first retrograde display member and a retrograde display device comprising a counting wheel driven by a drive wheel set, a transmission wheel set cooperating, on the one hand, with the counting wheel set and an elastic return member, in order to be moved alternately in a first direction of travel, during a first operating phase, and in a second direction of travel, during a second operating phase, and on the other hand, with the first display wheel set, via a first toothed sector. The transmission wheel set comprises at least one additional toothed sector providing a kinematic connection with an additional display wheel set intended to carry an additional retrograde display member, such that the display members are synchronised.

US Patent Application No 2002/141292A1 in the name of Marco BETTELINI, ETA SA Manufacture Horlogère Suisse, discloses the structure of a timepiece movement, more particularly the structure of the hour wheel, wherein the pipe interior includes an annular bulge cooperating with an annular groove disposed on the external wall of the cannon-pinion pipe. Thus, the hour wheel is snapped onto the movement, with no need to provide an additional part for this purpose, and its toothed wheel cannot therefore be released from the motion work pinion when the movement is transported.

WO Patent No 2013/127686 in the name of ETA SA Manufacture Horlogère Suisse discloses a timepiece movement driving at least one output arbor for reception of a physical or temporal magnitude display indicator opposite and above at least one complementary indicator or a dial. This complementary indicator or dial is disposed on a local reference or bearing surface comprised locally in the movement around each output arbor of the movement, or being arranged on such a local reference or bearing surface. At least one such output arbor comprises, on its local reference or bearing surface side, a free end which is either set back from or flush with its local reference or bearing surface.

FR Patent Application 2518775A1 in the name of JUNGHANS discloses a timepiece mechanism comprising a printed circuit board for electronic control of the movement, and a support plate retaining the printed circuit board, for an electromechanical transducer driving a train for driving an under-dial work, inserted in a case with two shells. The under-dial work is placed, on the front shell, side in front of the support plate, while the gear train is secured, on the rear shell side, behind the support plate thereon, as far as the third wheel passing through the support plate with its pinion and penetrating the under-dial work. This semi-conductor wafer is secured to the support plate of substantially plane conformation, at a short distance therefrom, and is connected thereto by pins, which are welded to the semiconductor wafer plating intended for conducting strips and anchored as winding connection pins in a stator winding core, which is carried by a stator stack of the stepping motor, positioned in the its rotor aperture area, in an interlocked arrangement behind the support plate and resting flat thereon. The semiconductor wafer encompasses, in an arc, the area occupied in front of the support plate by the center wheel (minute wheel) and the hour wheel of the under-dial work and carries, in front of the rear wall of the case, beside and/or underneath the gear wheels, the components of the electronic control assembly of the movement.

SUMMARY OF THE INVENTION

The invention proposes to achieve the guiding of wheel sets without an upper bar, and thereby to save the stamping of a bar, the study of tools, investment and components, and to obtain mechanisms of smaller thickness than in the prior art.

To this end, the invention concerns a motor group for watches, comprising a plurality of motor modules, each comprising a plate arranged for securing said module to a timepiece movement, and each comprising motor means arranged for driving at least one display wheel set, according to claim 1.

The invention also concerns a timepiece movement including at least one such motor group.

The invention also concerns a watch including such a motorization group.

BRIEF DESCRIPTION OF THE DRAWINGS

Other features and advantages of the invention will appear upon reading the following detailed description, with reference to the annexed drawings, in which:

FIG. 5 is a similar diagram to FIG. 4 illustrating a variant for stopping via a chock added to an outer wheel set mounted to pivot on the center pipe.

FIG. 6 is a similar diagram to FIG. 4 illustrating a variant for stopping an inner wheel set, via a protruding surface comprised in the inner wheel set.

FIG. 7 is a similar diagram to FIG. 4 illustrating a variant for stopping an outer wheel set, via a protruding surface comprised in the center pipe.

FIG. 16 comprises motor modules according to a different variant from that of FIGS. 11 to 15.

FIGS. 24 to 27, 28A, 28 B, 28C and 29 to 31 illustrate yet another variant, with the inner wheel set arbor stopped on the end of the center pipe by an axial stop which is pressed on.

DETAILED DESCRIPTION OF PREFERRED EMBODIMENTS

Figure 1:
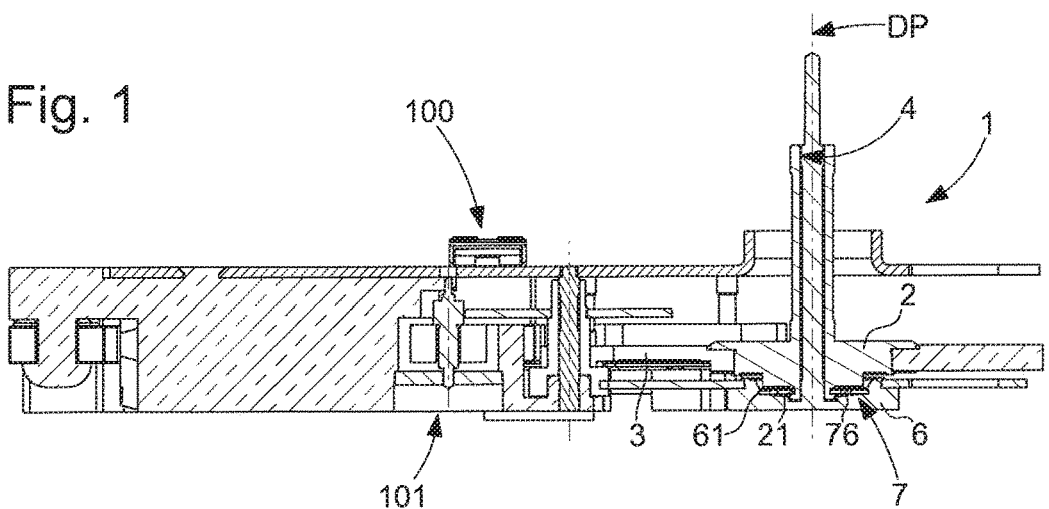
FIG. 1 represents a schematic, cross-sectional view, passing through the axis of pivoting of the wheel sets, of a timepiece motor module comprising a display mechanism, with a center pipe integrally secured to a plate, and acting as a guide for a center inner wheel set, comprising an arbor and the wheel, particularly a center-seconds wheel set, in a variant of the invention wherein this center pipe and inner wheel set have a relative axial displacement which is limited by a retaining ring housed inside an outer groove of the center pipe, and an inner groove of the inner wheel set, arranged on the wheel flange.

The invention concerns a motor group 200, comprising a plurality of modules, including at least one motor module 100, each motor module 100 comprising a plate 3 arranged for securing module 100 to a timepiece movement 500. At least one motor module 100, and more particularly each motor module 100, includes motor means 101, which are arranged to drive at least one display wheel set, and forms a timepiece display mechanism 1 comprising a center pipe 2, which is fixed on a plate: pressed on, bonded, snapped on, overmoulded, riveted, or by rivet washers or other means.

Such a motor group 200 may also comprise, in addition to motor modules 100, other transmitter modules, having no motor function, and reserved for intermediate wheels, secondary displays, gear reduction, reversals of the direction of rotation, or other.

This center pipe 2 comprises at least one main bore 4 and/or one main guide bearing surface 5, for receiving and guiding in rotation, about a main axis DP, a display wheel set 6, 8, internal or external to center pipe 2.

According to the invention, this module 100 comprises at least one axial stop 7, which is arranged to limit to a predetermined value the axial play in the direction of the main axis DP between center pipe 2 and display wheel set 6 or 8. This at least one axial stop 7 is either a protruding surface 28, 69 of center pipe 2 or of display wheel set 6, 8, or an added axial stop 71, 79, 76, 98, which is either captively mounted between center pipe 2 and display wheel set 6, 8, or secured to display wheel set 6, 8.

Figure 2:
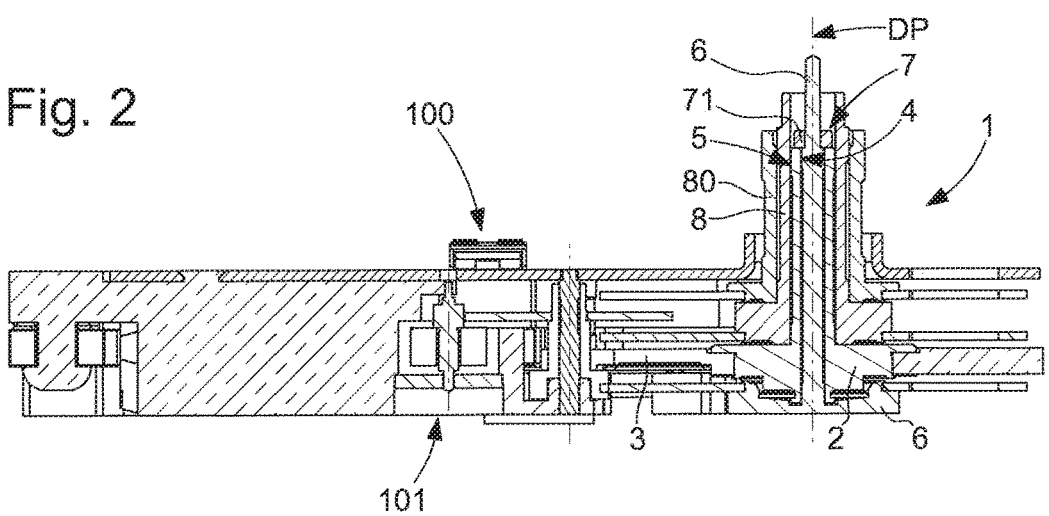
FIG. 2 represents, in a similar manner to FIG. 1, a similar module, also comprising a minute cannon-pinion and an hour cannon-pinion, and wherein the axial stop of the inner wheel set is achieved by an additional ring pressed onto its arbor.

FIGS. 2 and 5 illustrate a first embodiment wherein the axial stop comprises an added ring, secured to center pipe 2 or to a wheel set guided by center pipe 2.

FIG. 2 illustrates a variant of the invention wherein the display wheel set is an inner wheel set 6, guided inside main bore 4 of center pipe 2. Axial stop 7 is an added axial stop here comprising a first ring 71 pressed onto a first bearing surface 66 of inner wheel set 6, bearing on a first shoulder 67 comprised in inner wheel set 6, at one end of first bearing surface 66. First ring 71 includes, facing plate 3, a first stop face 74, which is arranged to form a stop with respect to a first upper face 24 of center pipe 2. Inner wheel set 6 includes, on the opposite side to first bearing surface 66 with respect to plate 3, a first end face 63, which is opposite to a first lower face 23 of center pipe 2. In particular, first upper face 24 and/or first lower face 23 is perpendicular to main axis DP. In particular, first shoulder 67 and/or first end face 63 is perpendicular to main axis DP. In particular, first stop face 74 is perpendicular to main axis DP.

The relative displacement of inner wheel set 6 with respect to center pipe 2 is thus limited on the upper level by an abutting engagement between first stop face 74 and first upper face 24 and, on the lower level opposite the upper level, by an abutting engagement between first end face 63 and first lower face 23.

FIG. 5 illustrates a variant of the invention, similar to that of FIG. 2, but wherein the display wheel set is an outer wheel set 8, guided on a main bearing surface 5 of center pipe 2. Axial stop 7 is an added axial stop comprising a second ring 79 pressed onto a second bearing surface 29 of center pipe 2, bearing on a second shoulder 27 comprised in center pipe 2, at one end of second bearing surface 29. This second ring 79 comprises, facing plate 3, a second stop face 78, which is arranged to form a stop with respect to a second upper face 88 comprised in outer wheel set 8. Outer wheel set 8 includes, on the opposite side to second upper surface 88 and as close as possible to plate 3, a second end face 86, which is opposite to an intermediate face 26 of center pipe 2. The relative displacement of outer wheel set 8 with respect to center pipe 2 is thus limited on the upper level by an abutting engagement between second stop face 78 and second upper face 88 and, on an intermediate level situated between plate 3 and the upper level, by an abutting engagement between second end face 86 and intermediate face 26.

More particularly, inner wheel set 6 is a center-seconds wheel, whose axial retention at Z is thus ensured by a ring pressed onto the arbor from the hand side.

In a variant where disassembly is not envisaged, the added ring may be pressed on, bonded, welded, riveted, crimped? or suchlike.

FIGS. 6 and 7 illustrate a second embodiment wherein the axial stop comprises a protruding surface on center pipe 2 or on a wheel set guided by center pipe 2.

FIG. 6 illustrates a configuration wherein the display wheel set is also an inner wheel set 6 guided inside main bore 4 of center pipe 2. This time, axial stop 7 comprises a first protruding surface 69, comprised in inner wheel set 6 and which defines, facing plate 3, a first stop surface 68, which is arranged to form a stop with respect to first upper face 24 of center pipe 2.

This protruding surface may be achieved by deforming the arbor of inner wheel set 6, or by addition of material, or by local deformation created by removal of material. In a non-limiting manner, it is possible to push back the material of the arbor of inner wheel set 6 locally, to form a bulge, or to pre-machine the arbor with a folding lip using a riveting head or, after assembling the arbor of inner wheel set 6, already inserted inside center pipe 2 and bearing on a lower surface, to machine peripheral craters using a laser beam just above the end face of center pipe 2, or to form a single undercut of revolution, having one lip that forms the stop, or to make a plasma deposition or weld one spot or several spots or a line, or other.

As in the variant of FIG. 2, inner wheel set 6 includes, on the side opposite first bearing surface 66 with respect to plate 3, a first end face 63 opposite to first lower face 23 of center pipe 2. The relative displacement of inner wheel set 6 with respect to center pipe 2 is limited on the upper level by an abutting engagement between first stop surface 68 and first upper face 24 and, on the lower level opposite said upper level, by an abutting engagement between first end face 63 and first lower face 23.

FIG. 7 illustrates a variant of the invention, similar to that of FIG. 6, but wherein the display wheel set is also an outer wheel set 8, guided on a main bearing surface 5 of center pipe 2. Axial stop 7 is a second protruding surface 28, comprised in center pipe 2, and which comprises, facing plate 3, a second stop surface 280, arranged to form a stop with respect to a second upper face 88 comprised in outer wheel set 8. This second protruding surface 28 may be achieved in a similar manner to first protruding surface 69 of FIG. 6. Outer wheel set 8 includes, on the opposite side to second upper surface 88 and as close as possible to plate 3, a second end face 86, opposite to an intermediate face 26 of center pipe 2. The relative displacement of outer wheel set 8 with respect to center pipe 2 is thus limited on the upper level by an abutting engagement between second stop surface 280 and second upper face 88 and, on an intermediate level situated between plate 3 and the upper level, by an abutting engagement between second end face 86 and intermediate face 26.

Figure 3:
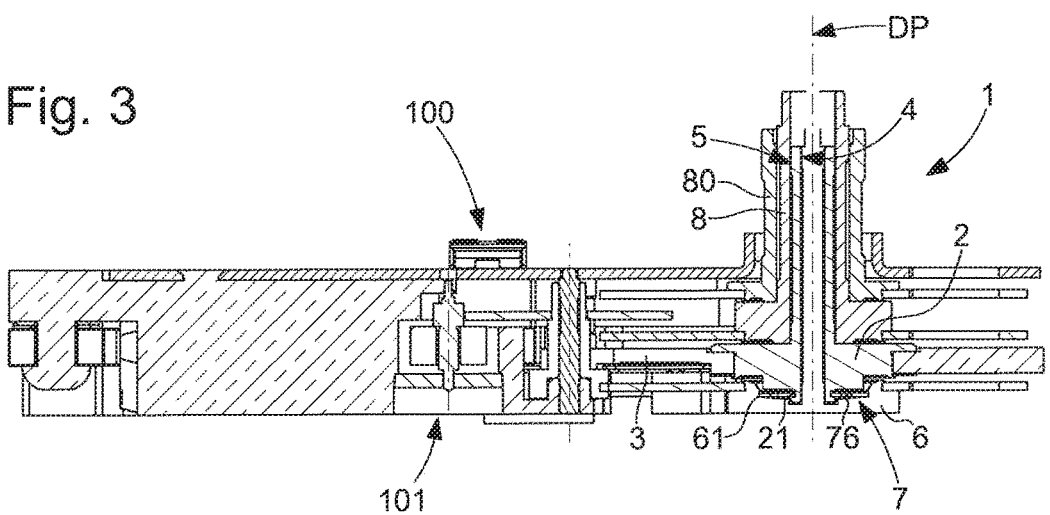
FIG. 3 represents, in a similar manner to FIG. 2, a module with the same configuration, and wherein the axial stop of the inner wheel set is achieved by a retaining ring, as in the example of FIG. 1.
Figure 4:
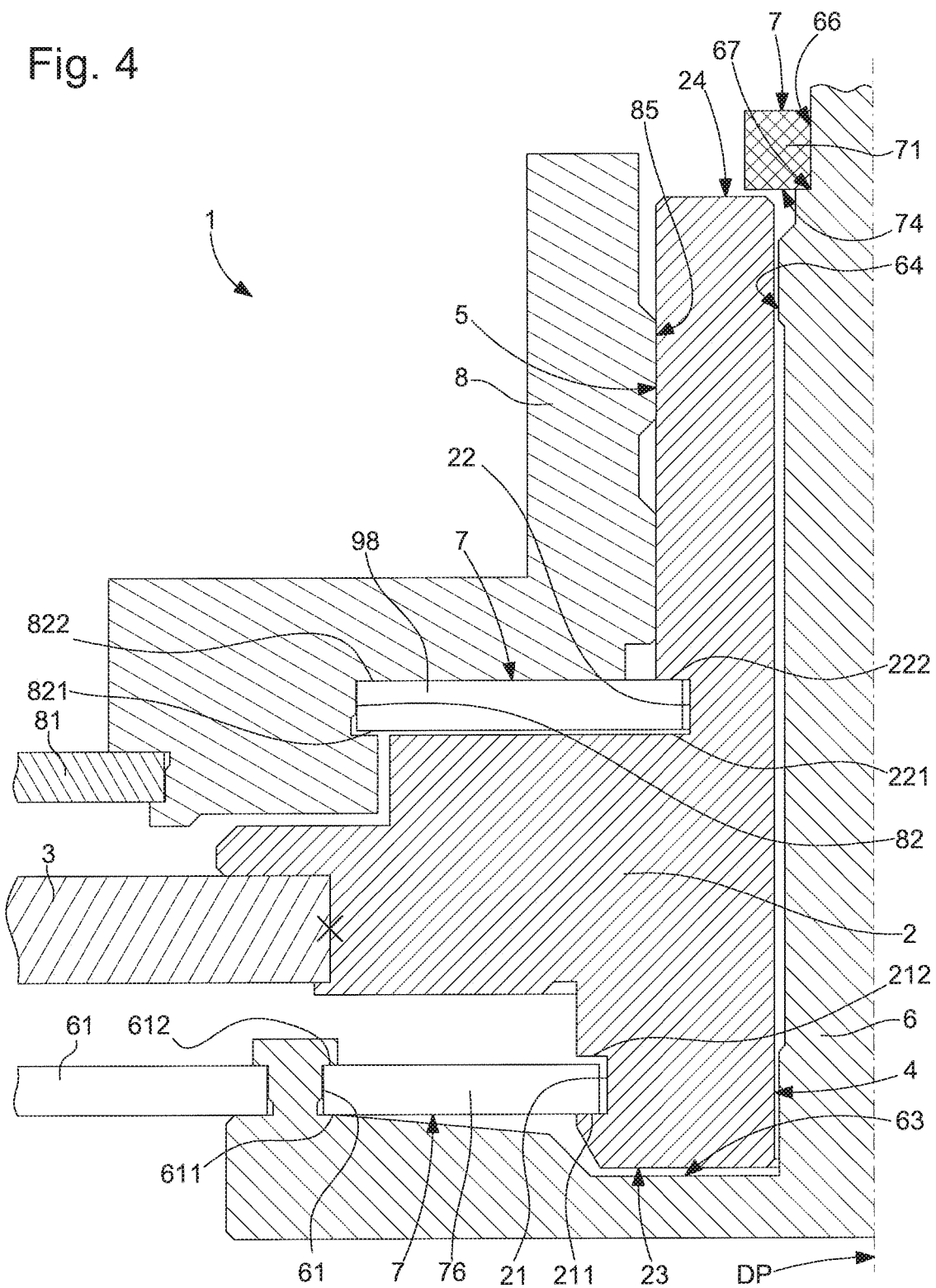
FIG. 4 is a purely illustrative diagram for viewing the surfaces present in the different variants, also in cross-section passing through the axis of pivoting of the wheel sets, representing an inner wheel set comprising both of the two stop variants, by a ring added to its upper end, by retaining rings on its wheel flange, and an outer wheel set pivoting on the center pipe and axially stopped by a retaining ring.

FIGS. 3 and 4 illustrate a third embodiment wherein axial stop 7 comprises at least one intermediate component, which is captively mounted between center pipe 2 and wheel set 6, 8, guided by center pipe 2. More particularly, this intermediate component is a resilient component, such as a retaining ring or suchlike. More particularly still, axial stop 7 is an added axial stop comprising a retaining ring 76, 98, housed both inside an outer groove 21, 22 in center pipe 2 and inside an inner groove 61, 82 of wheel set 6, 8.

FIG. 3 illustrates a variant wherein the display wheel set is an inner wheel set 6 guided inside main bore 4 of center pipe 2. The added axial stop is a first retaining ring 76 here, housed both inside a first outer groove 21 of center pipe 2, and inside a first inner groove 61 of inner wheel set 6. The relative displacement of inner wheel set 6 with respect to center pipe 2 is limited by an abutting engagement between first retaining ring 76, on the one hand, and first lateral surfaces of inner grooves 211, 212 of first outer groove 21 and first lateral surfaces of outer grooves 611, 612 of first inner groove 61 on the other hand.

FIG. 4 illustrates a variant wherein the display wheel set is an outer wheel set 8 guided on main bearing surface 5 of center pipe 2. Added axial stop 7 is a second retaining ring 98 here, housed both inside a second outer groove 22 of center pipe 2, and inside a second inner groove 82 of outer wheel set 8. The relative displacement of outer wheel set 8 with respect to center pipe 2 is limited by an abutting engagement between second retaining ring 98, on the one hand, and second lateral surfaces of inner grooves 221, 222 of second outer groove 22 and second lateral surfaces of outer grooves 821, 822 of second inner groove 82 on the other hand.

More particularly, inner wheel set 6 is a center-seconds wheel, whose axial retention at Z is thus ensured by a retaining ring pre-mounted on the center pipe; the seconds wheel is then snapped onto the retaining ring via its inner groove when the seconds wheel is pushed as far as possible at Z against center pipe 2, as illustrated in FIGS. 11 to 16 explained below.

Figure 8:
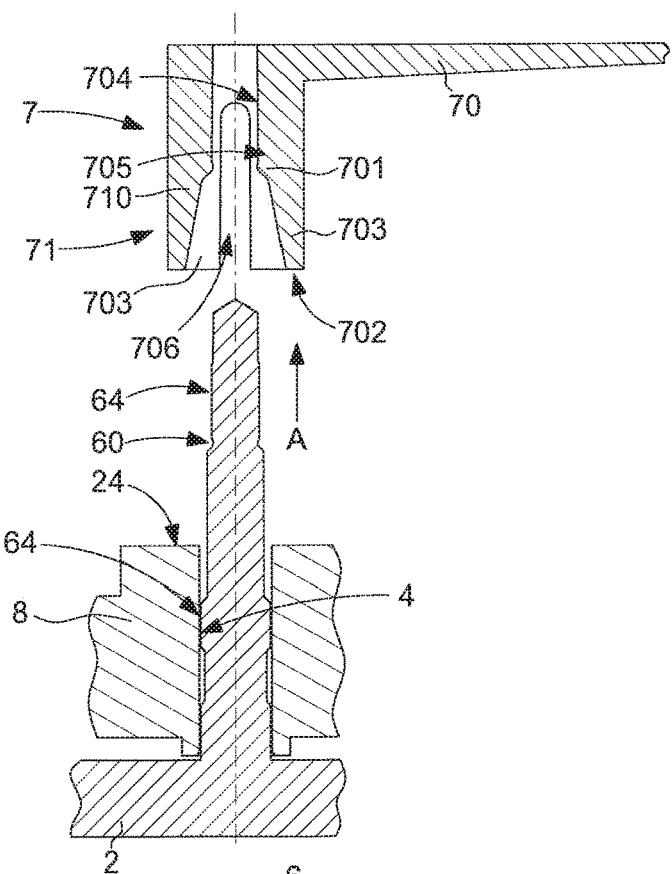
FIG. 8 represents a schematic, cross-sectional view, passing through its axis of pivoting, of an assembly comprising a hand arranged to form a stop added to the arbor of the inner wheel set to stop it axially, and the module carrying this inner wheel set, before attachment of the hand.
Figure 9:
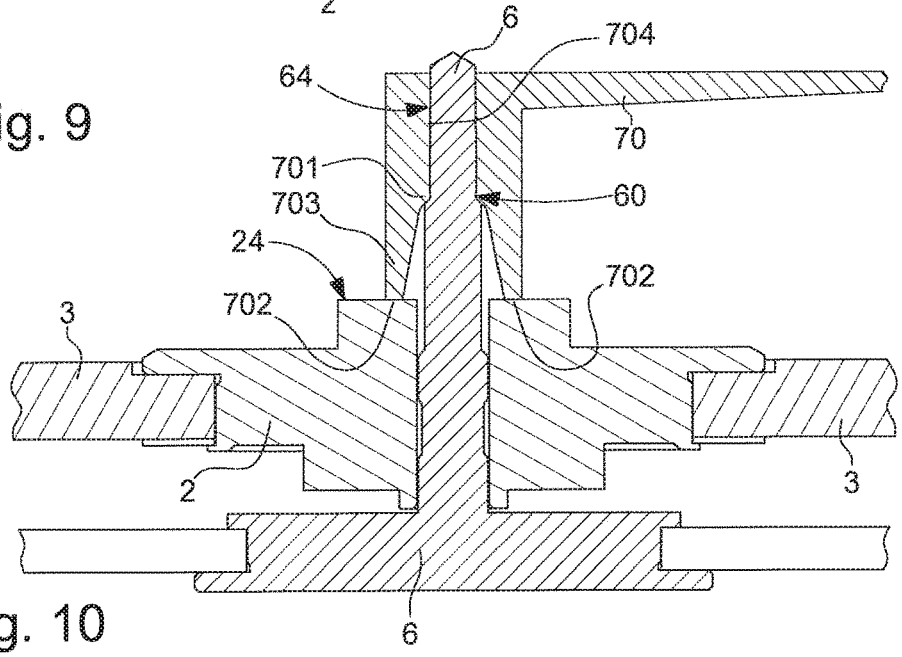
FIG. 9 represents, in a similar manner to FIG. 8, the same assembly after the hand has been fastened to the inner wheel set arbor.
Figure 10:
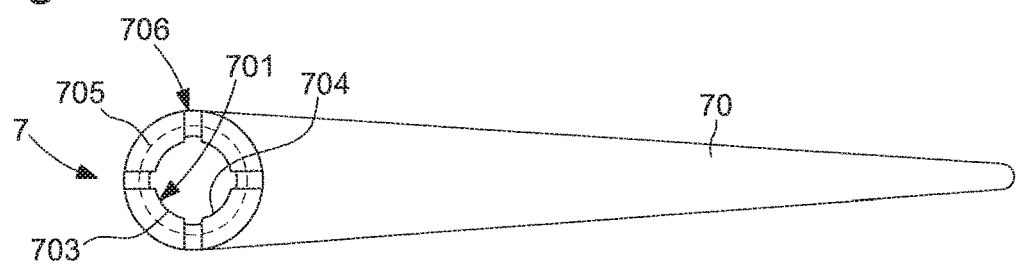
FIG. 10 shows a schematic bottom view, along arrow A of FIG. 8, of the same hand prior to fastening.

In a particular embodiment of the first embodiment, and as regards only inner wheel set 6 illustrated in FIG. 2, and as seen in FIGS. 8 to 10, first ring 71 is formed by the pipe 710 of a hand 70 fitted onto inner wheel set 6, resting via an end pipe surface 702 comprised in pipe 710, on the first upper end 24 of center pipe 2. More particularly, pipe 710 includes elastic lips 703 whose end forms pipe end surface 702, and which are arranged to allow an inner flange 701 of pipe 710 to be snapped onto a peripheral groove 60 comprised in the arbor of inner wheel set 6, determining the exact dimension of the axial stop retention.

In yet another variant, hand 71 is pressed onto a first bearing surface 66 of the arbor of inner wheel set 6, abutting on a first shoulder 67 comprised in inner wheel set 6, at one end of first bearing surface 66. More particularly, this inner wheel set 6 is a center-seconds wheel set. In this variant, it is the pipe 710 of the hand that forms a stop on the first upper face 24 of center pipe 2. The press-fit dimension can thus be controlled, and therefore the position of the stop since the hand is pressed against a shoulder.

FIGS. 17 to 23 illustrate another variant, with the assembly of three concentric gear trains with the plate which acts as a retaining ring, thereby removing the need for the bar on the case back side and the bar on the dial side. The center pipes and arbors are mounted riveted to their plates, and then upon vertical insertion, the wheel sets are snapped into position. They form an inseparable assembly.

Figure 18:
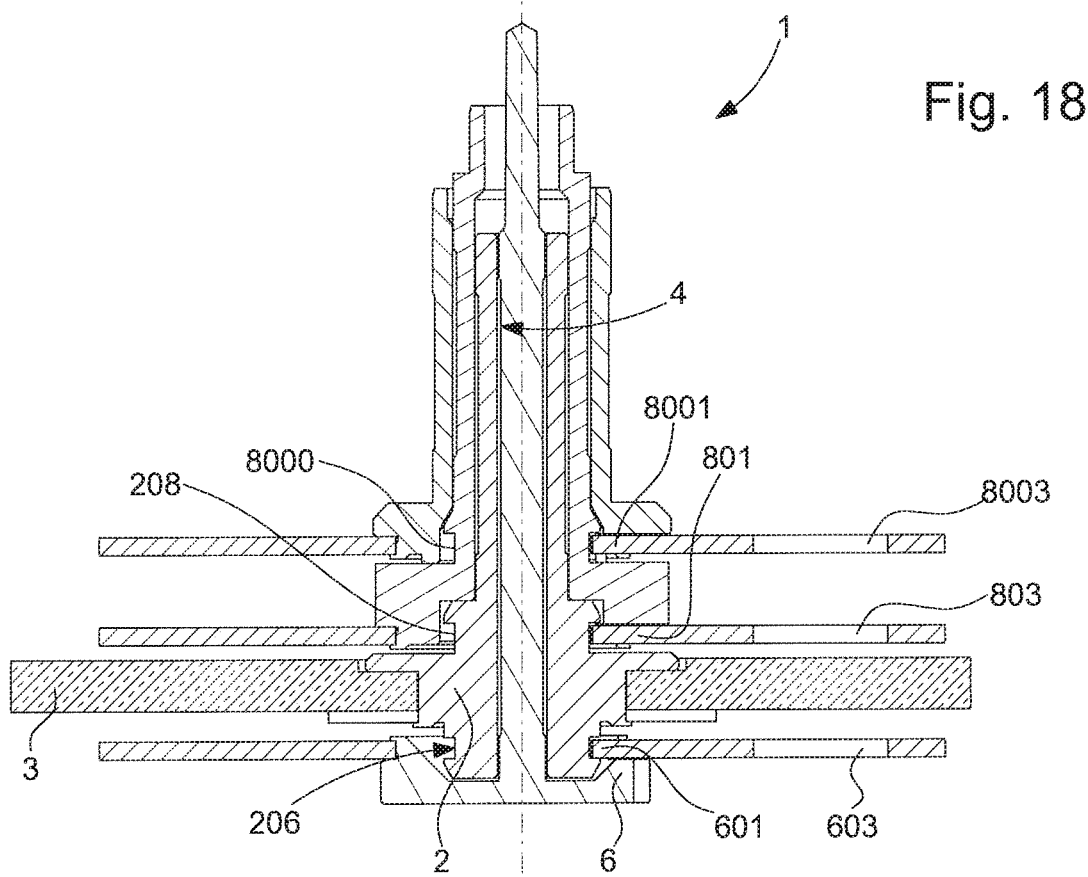
Figure 19:
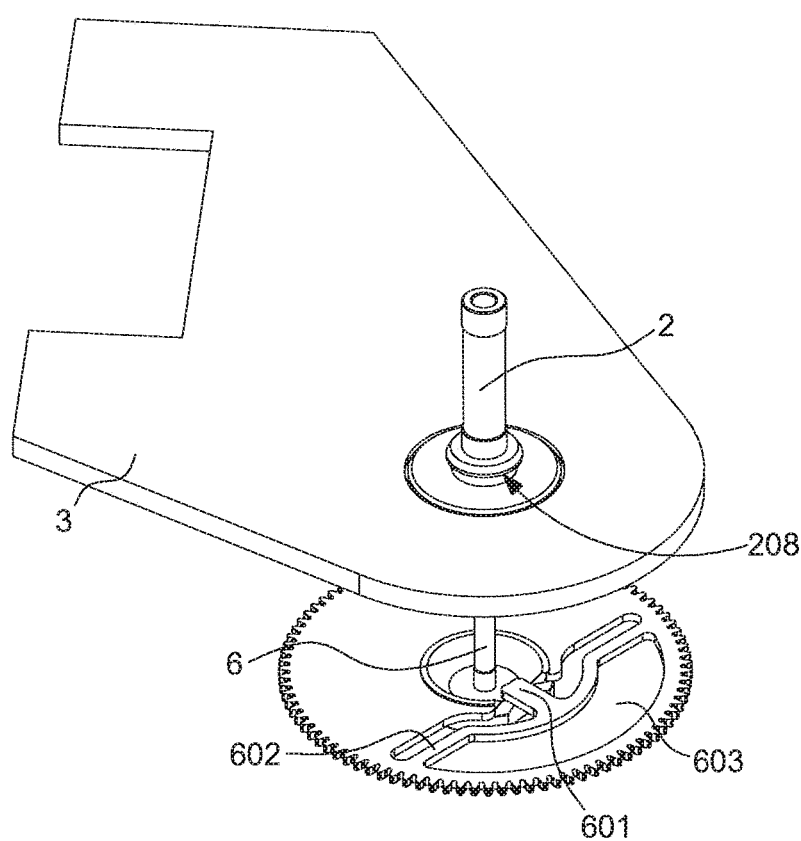
Figure 20:
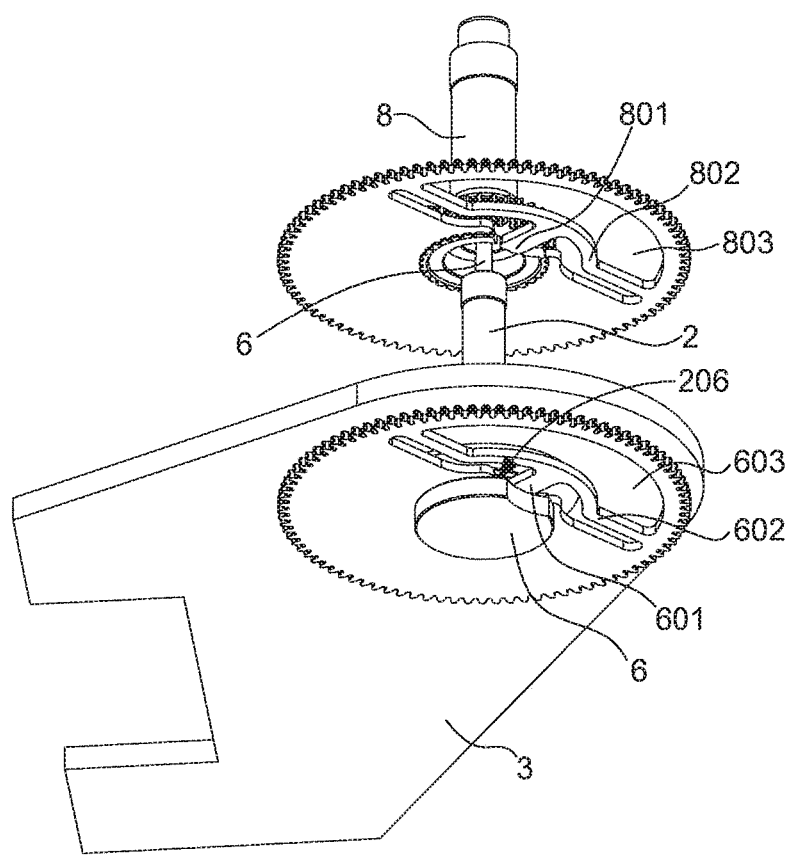

More precisely, inner wheel set 6, which more particularly carries the seconds arbor, comprises a wheel including a marked opening 603, which also delimits an arm 602 carrying a flexible tongue 601, arranged for snap fit engagement with a lower groove 206 comprised in center pipe 2, for the axial stopping thereof, as seen in FIGS. 18, 19 and 20.

Figure 21:
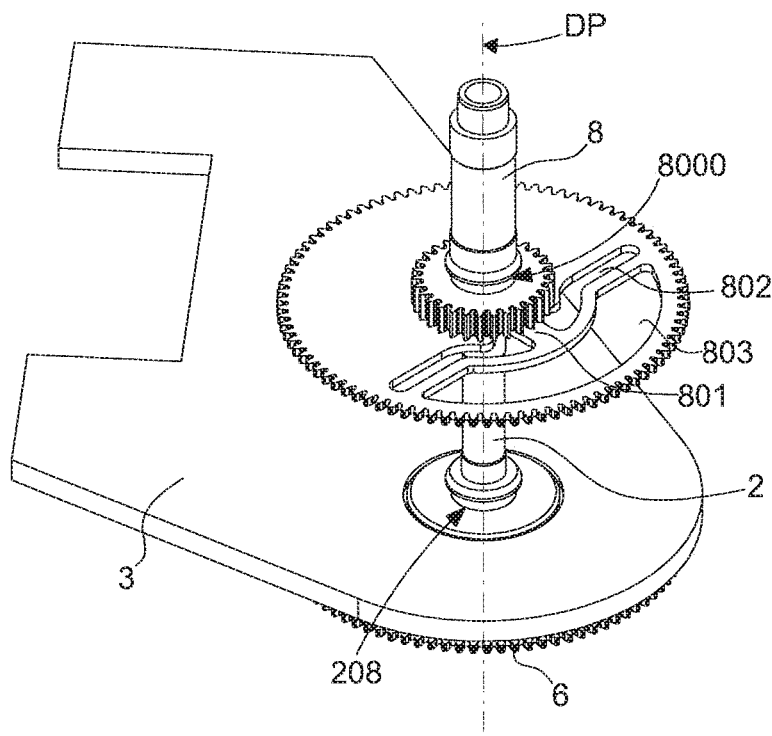

Outer wheel set 8, more particularly the minute wheel, comprises a similar arrangement, and includes a wheel including a marked opening 803, which also delimits an arm 802 carrying a flexible tongue 801, arranged for snap fit engagement with a median groove 208 comprised in center pipe 2, for the axial stopping thereof, as seen in FIGS. 18, 20 and 21.

Figure 22:
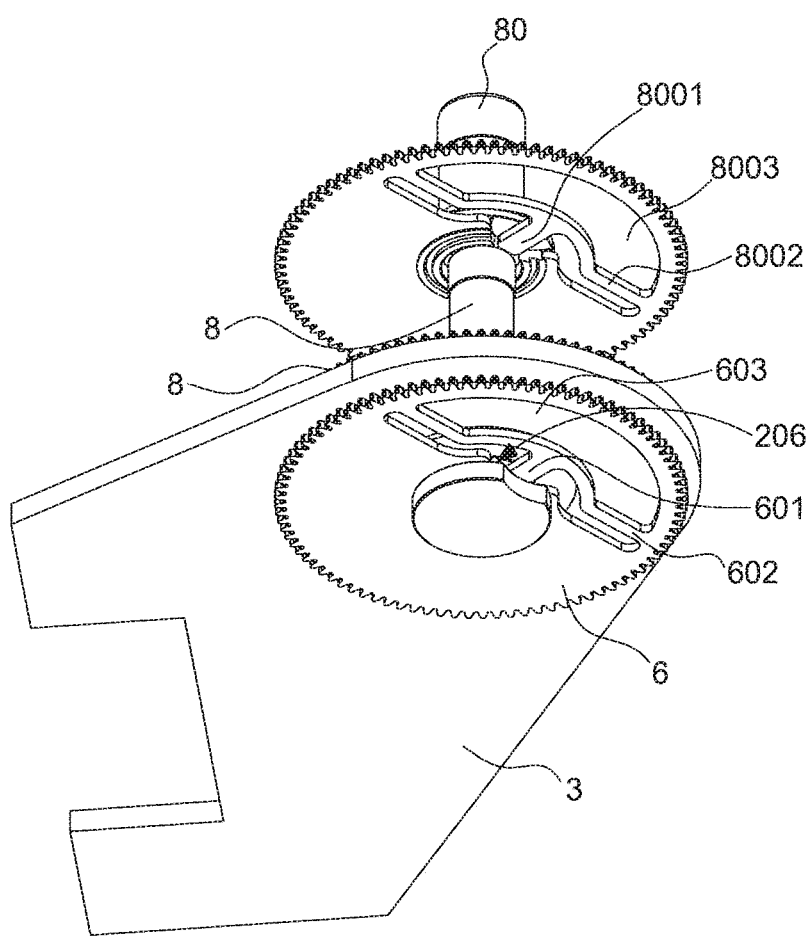
Figure 23:
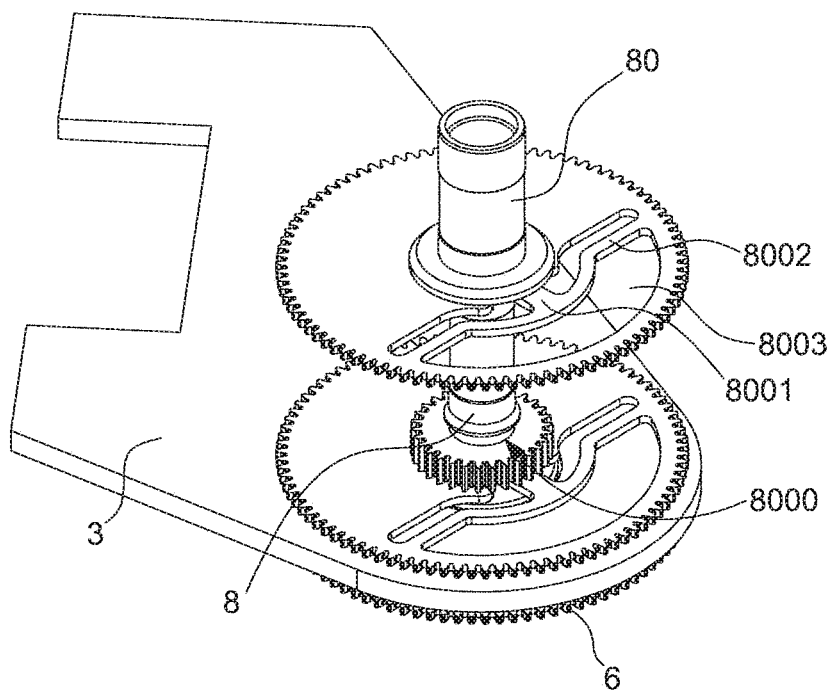

An upper wheel set 80, more particularly the hour wheel, in a similar manner to FIGS. 2 and 3, comprises a similar arrangement, and includes a wheel including a marked opening 8003, which also delimits an arm 8002 carrying a flexible tongue 8001, arranged for snap fit engagement with an upper groove 8000 comprised in outer wheel set 8, for the axial stopping thereof, as seen in FIGS. 18, 22 and 23.

FIGS. 17 to 23 illustrate yet another variant, with the assembly of three concentric gear trains, in a mixed solution with axial stops both via pressed-in axial stop 71 and via retaining rings. Here too, it is possible to omit the back cover side bar and the dial side bar.

Figure 24:
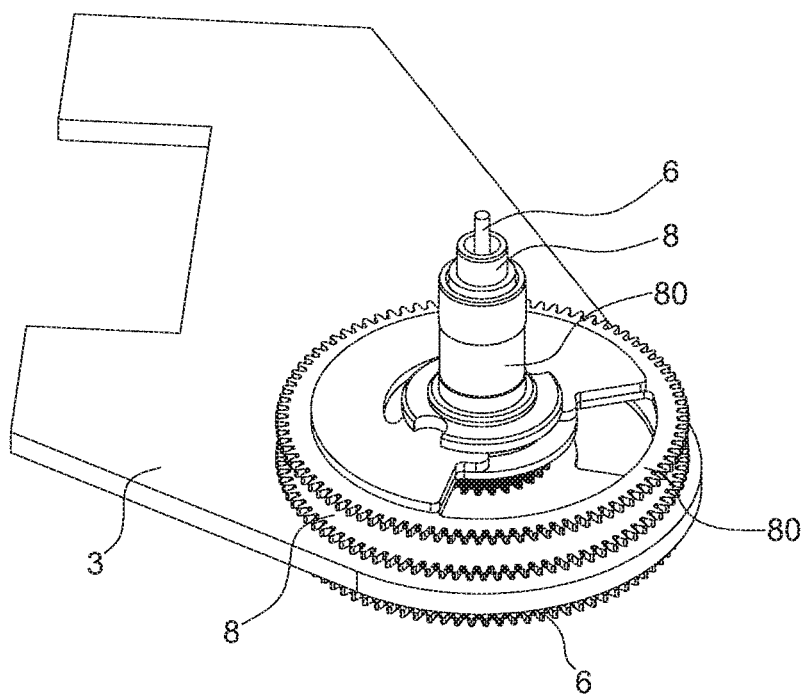
Figure 25:
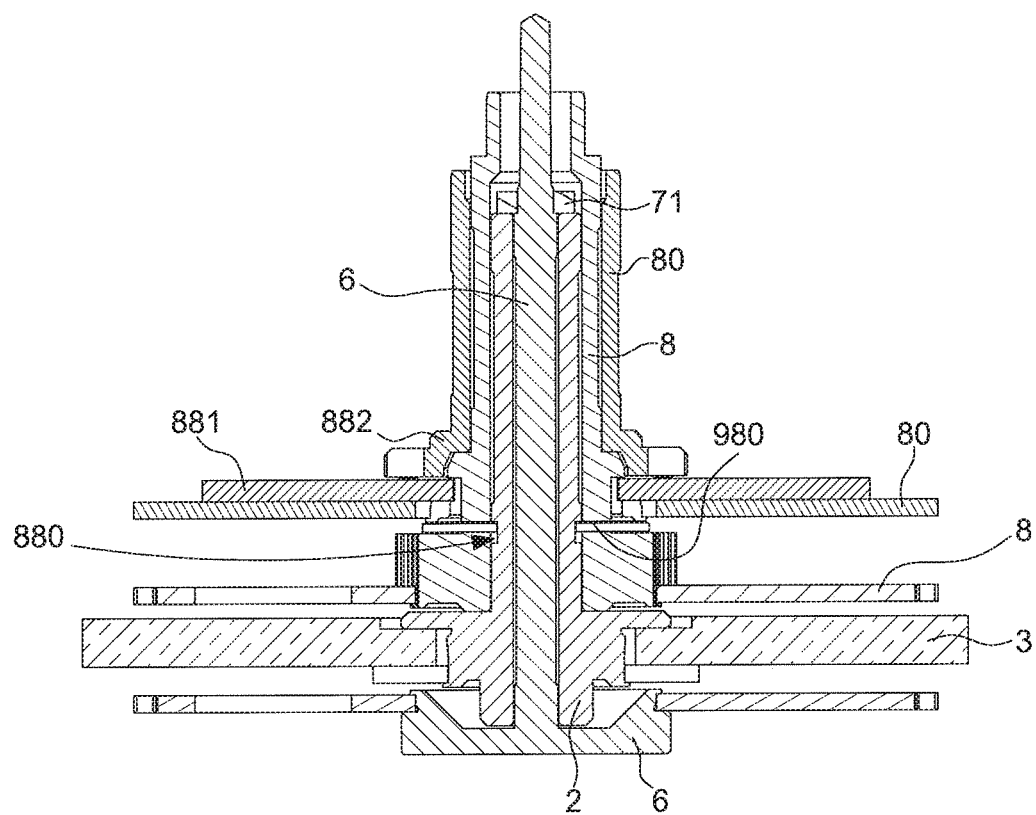
Figure 26:
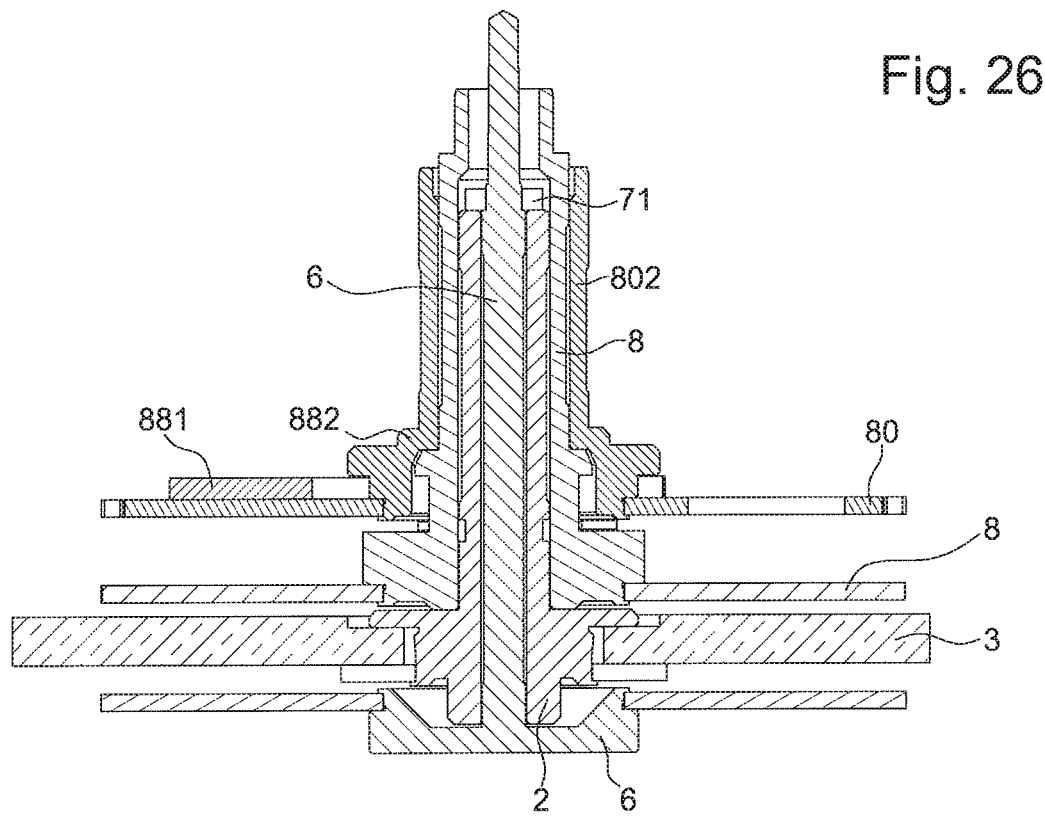
Figure 27:
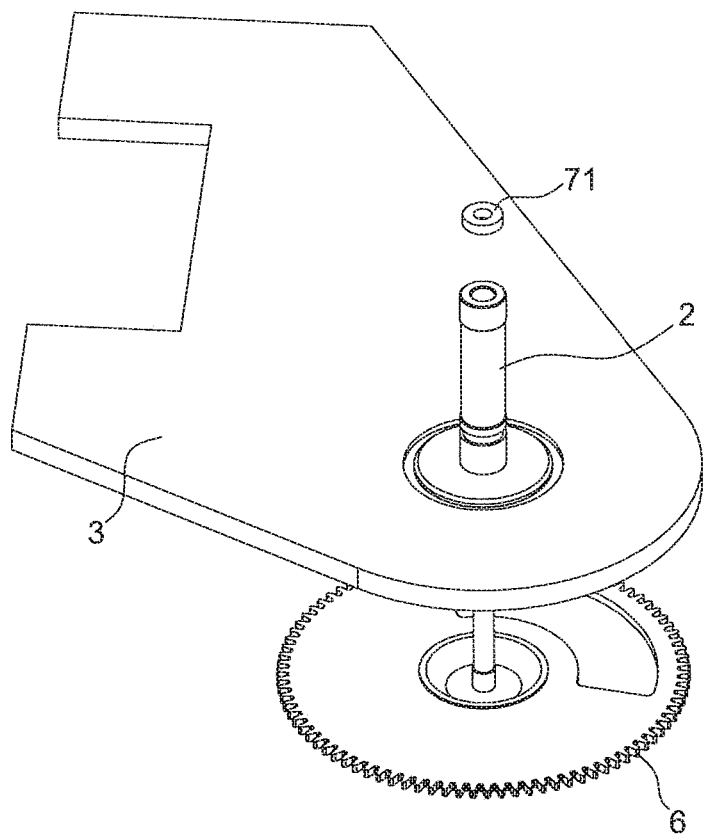

More precisely, in yet another variant, represented in FIGS. 24 to 31, the arbor of inner wheel set 6, more particularly a seconds arbor, is stopped on the end of center pipe 2 by a pressed-in axial stop 71, as seen in FIGS. 24 to 26.

Outer wheel set 8, which more particularly carries the minute pinion, includes two slots 880 for blocking the wheel set axially with a retaining ring 980, above which outer wheel set 8 includes a stop groove 883.

Upper wheel set 80, which more particularly carries the cannon-pinion, in a similar manner to FIGS. 2 and 3, includes a wheel comprising a marked opening, and includes a large retaining ring 881, already pre-assembled on the wheel, of a slightly lower maximum diameter than that of the wheel, and stopped by a shoulder of cannon-pinion 882, and, upon axial insertion, the wheel is snapped into position in stop groove 883.

Retaining ring 881 also includes a cutout, which can thus raise the level of the capacitive opening (0.15 mm) on the closest board. The latter can also save counterweight on the hour wheel set and thus makes it possible to mount an hour hand with optimized unbalance.

Figure 28A:
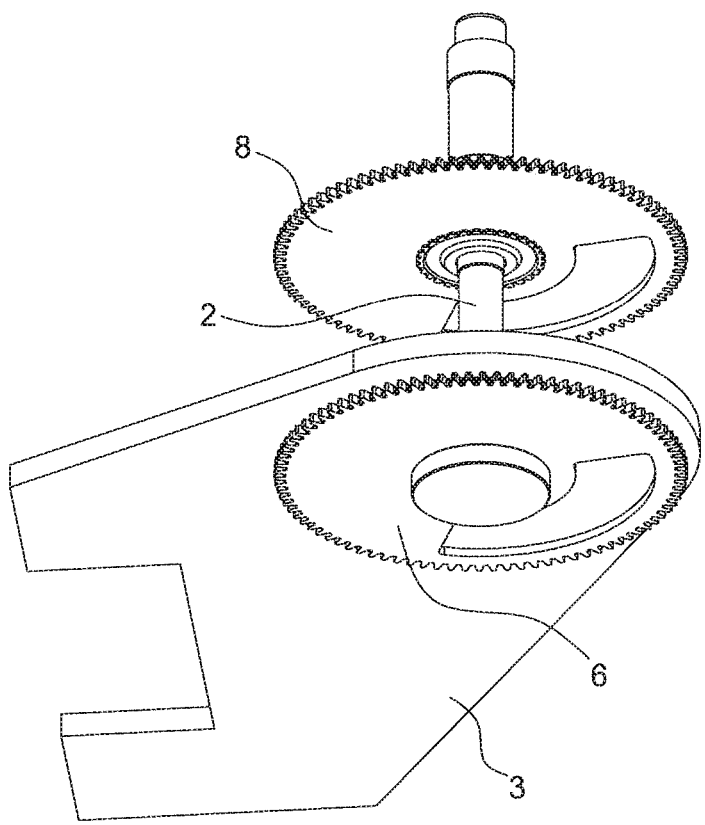
Figure 28B:
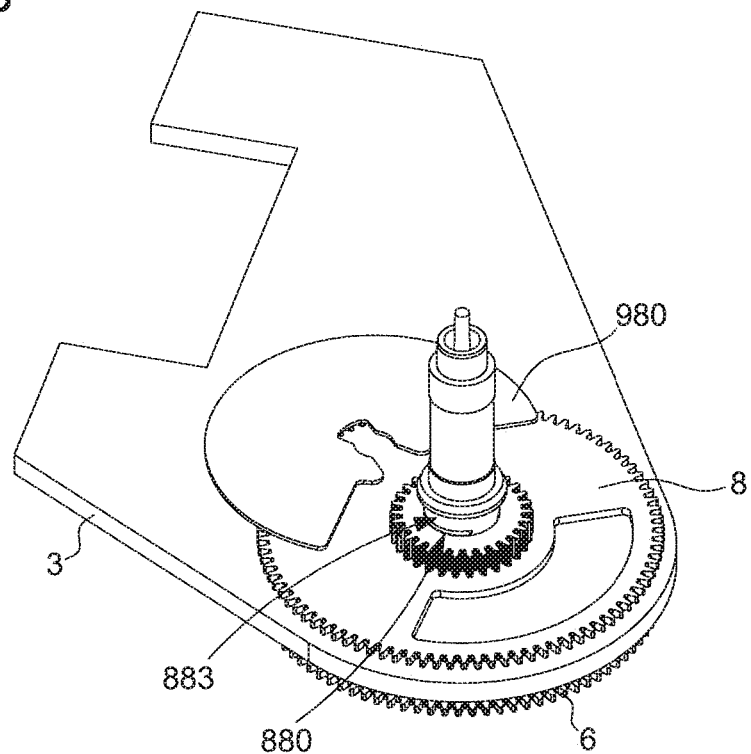
Figure 28C:
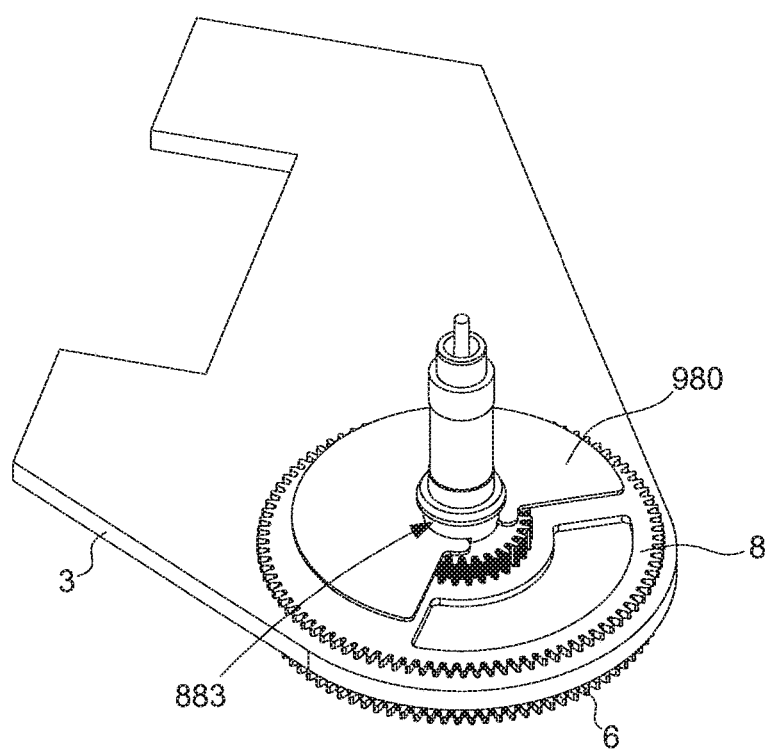
Figure 29:
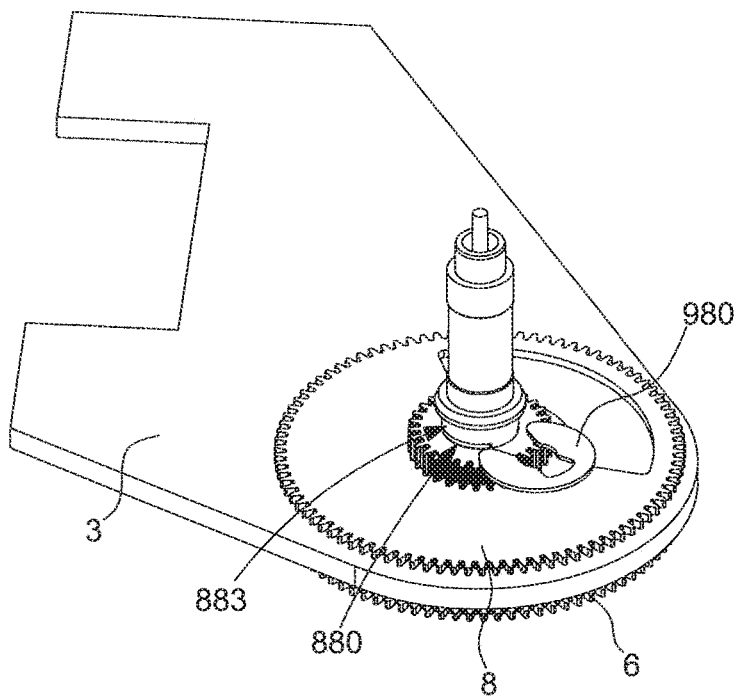
Figure 30:
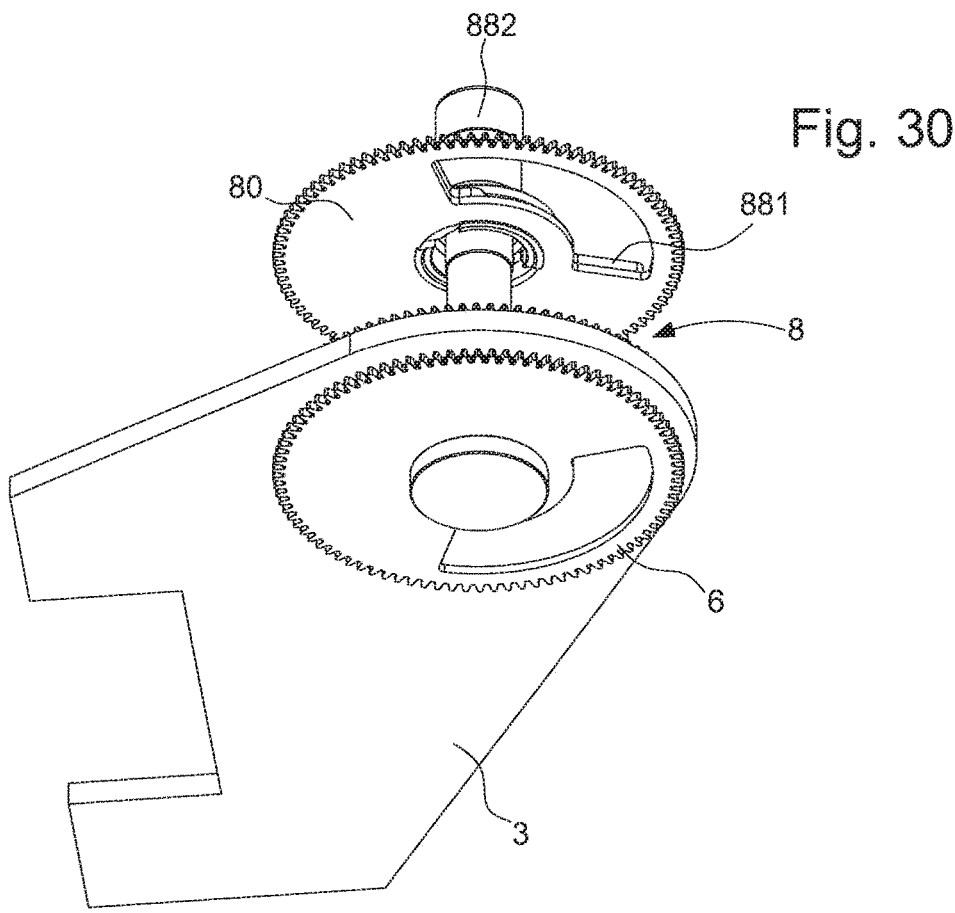
Figure 31:
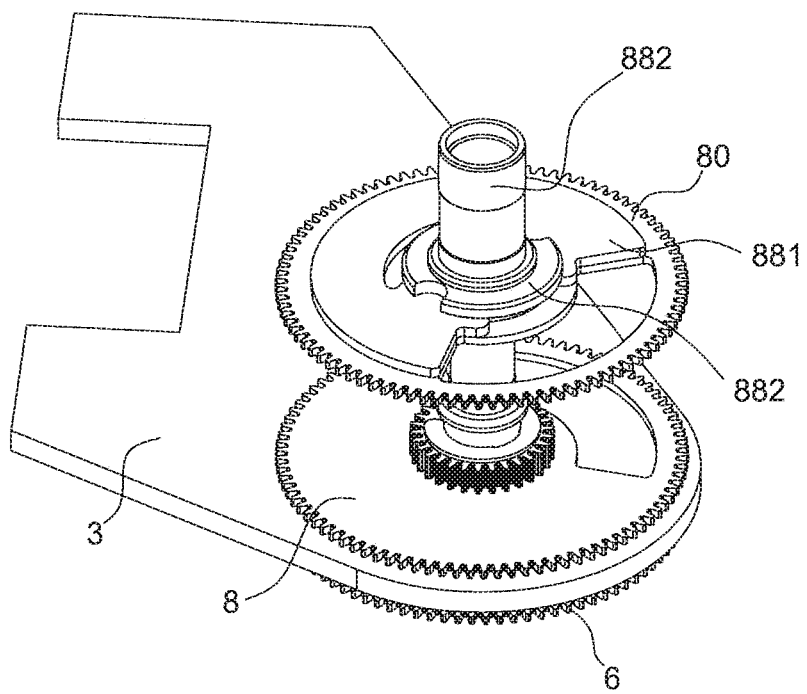
Figure 32:
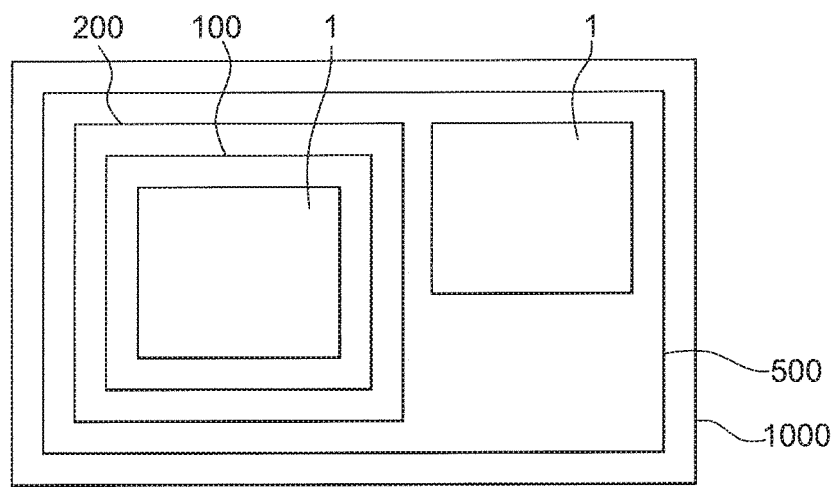
FIG. 32 is a block diagram representing a watch including a movement with such a motor group, such a module and such a display mechanism.

This improvement can also be extended to the minute wheel for the unbalance of the hand. FIGS. 28B and 28C illustrate a variant which also has a key 980 of large diameter, very close to that of the wheel, wherein the angular orientation of the cutout corresponds, when mounted, to the cutout in the wheel.

More particularly, motor group 200 and module 100 comprised therein, includes the features disclosed in EP Patent Application 15201458.5 by the same Applicant, relating to a motor module for watches.

Motor group 200 according to the invention comprises a plurality of modules, including at least one motor module 100, and, in a particular embodiment, a plurality of motor modules 100, each comprising a plate 3 arranged for securing the module concerned to a timepiece movement 500. At least one of these motor modules 100, and, preferably, each of these motor modules 100 includes motor means 101 arranged for driving at least one display wheel set 6, 8. In a variant, motor group 200 does not simply include motor modules, but also at least one intermediate wheel module devoid of motor means and comprising simply an intermediate gear train. According to the invention, at least one of motor modules 100 forming motor group 200 includes a display mechanism 1, whose plate 3 is arranged to secure module 100 to a timepiece movement 500. It is clear that such a motor group 200 is self-supporting, and does not require attachment to another plate. Supplemented by energy storage means and control and drive means, it may form such a movement 500. This motor group 200 may also be directly fixed inside a watch case 100.

In a variant, motor group 200 comprises a plurality of modules 100, each arranged to drive at least one such display wheel set 6, 8.

Thus, more particularly, module 100 is a module for watches, comprising power and control means.

More particularly, module 100 is a motor module without a bar for the center-seconds arbor.

More particularly, motor group 200 is a motor group for watches, comprising power and control means.

FIGS. 11 to 16 illustrate such a motor group 200 comprising three motor modules 100 assembled in a Y-shape (triangular star, branches at 120°), each comprising motor means 101 arranged to drive at least one display wheel set.

Figure 11:
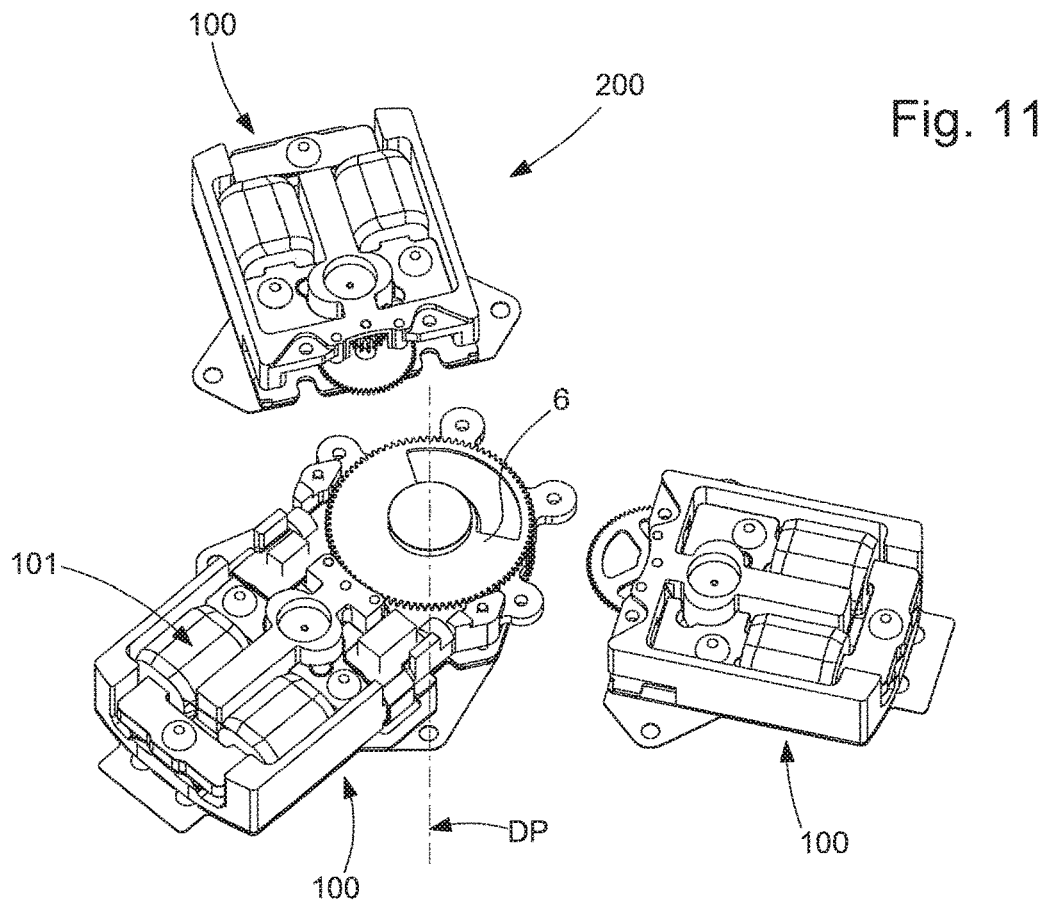
FIGS. 11 to 16 represent schematic and perspective views of a motor group according to the invention, comprising three motor modules, each comprising motor means arranged for driving at least one display wheel set, in the successive operations of a mounting sequence.
Figure 12:
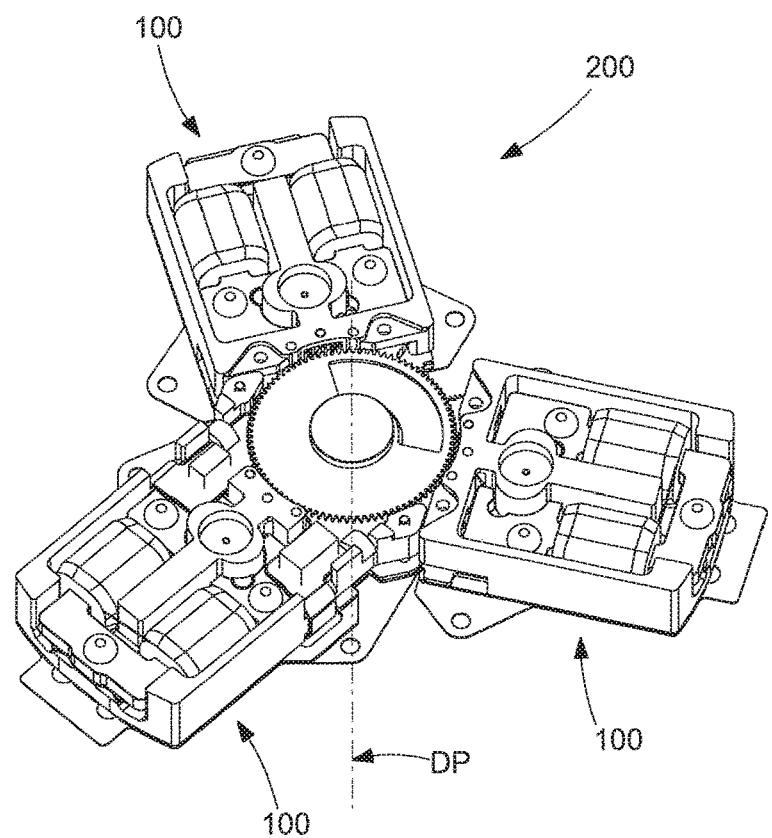
Figure 13:
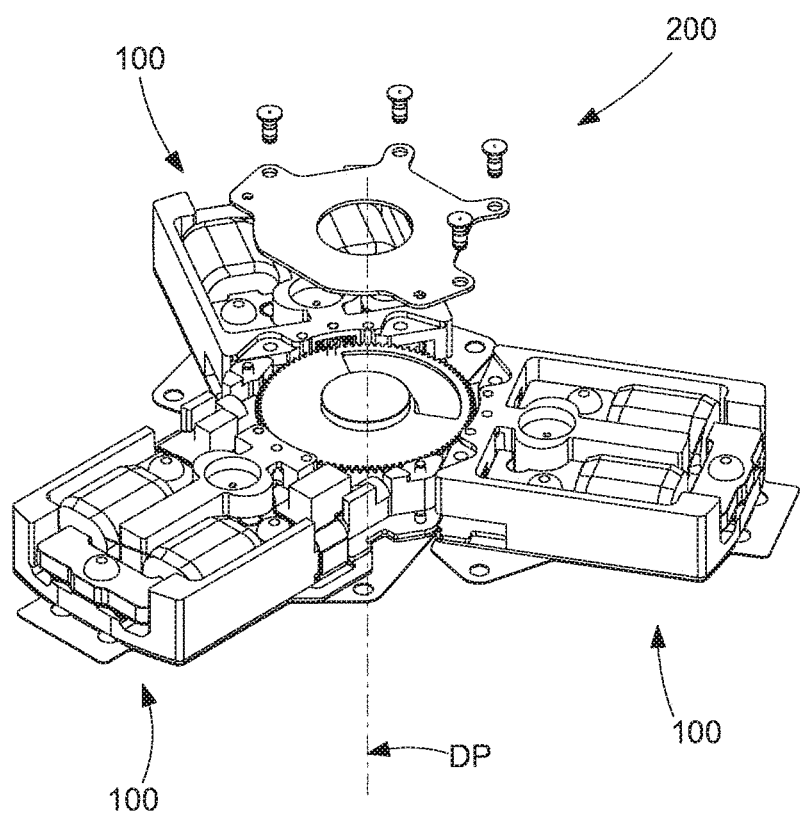
Figure 14:
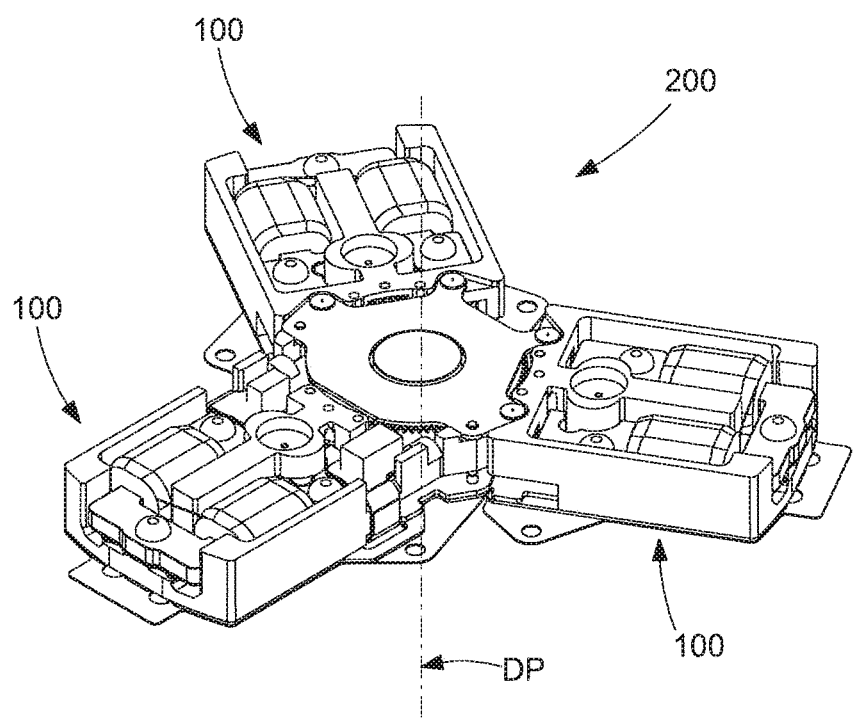
Figure 15:
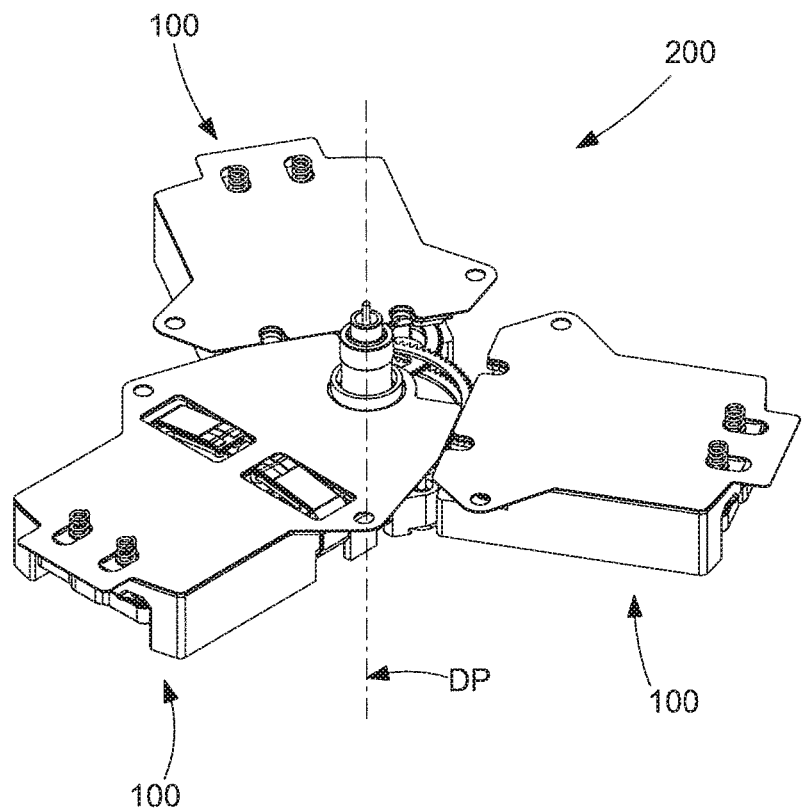
Figure 16:
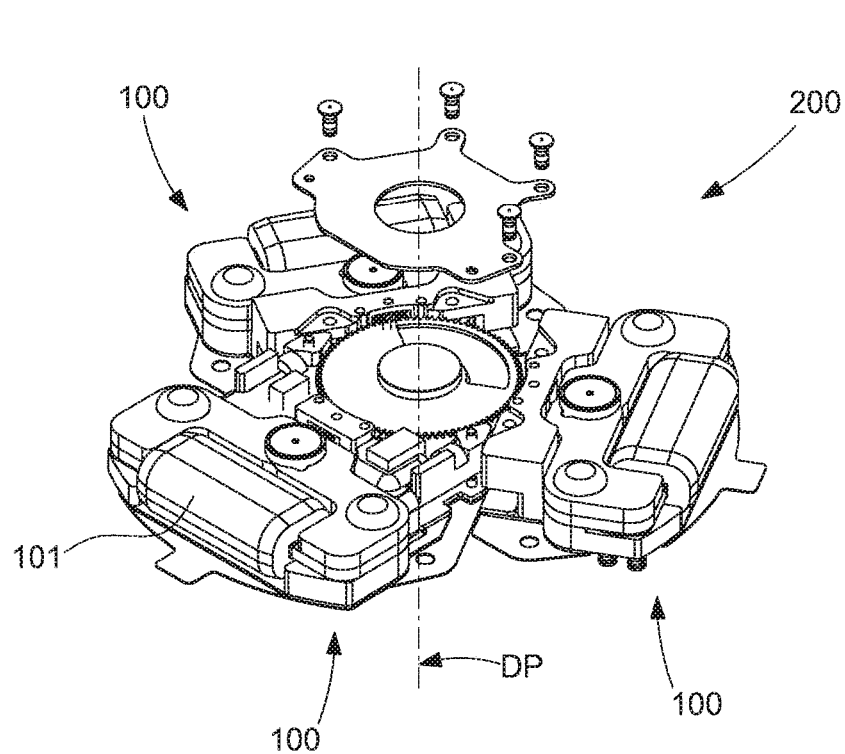
Figure 17:
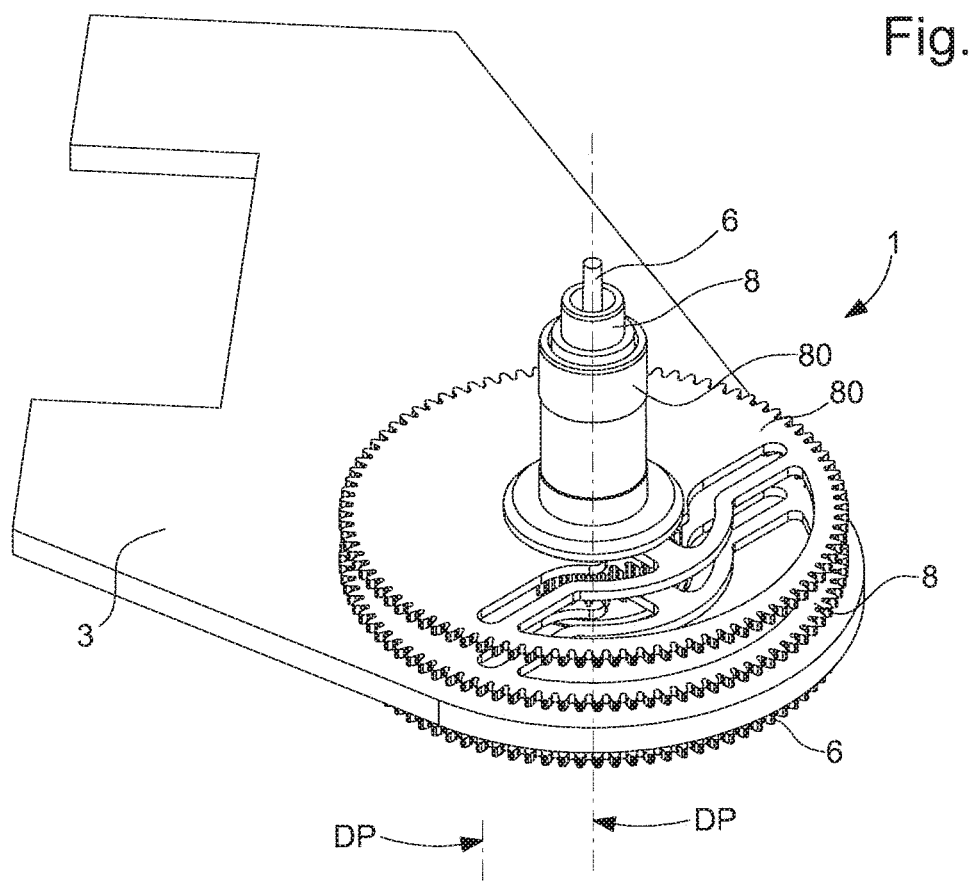
FIGS. 17 to 23 illustrate another variant, with the assembly of three concentric gear trains with the plate which acts as a retaining ring, thereby removing the need for the bar on the case back side and the bar on the dial side.

According to a particular assembly sequence, this group 200, formed by the three modules pre-assembled on their plates 3, receive a center pipe 2 in FIG. 11, a retaining ring 76, presented at an outer groove 21 of center tube 2, then snapped on, an inner wheel set 6 is inserted inside center pipe 2, then inner wheel set 6 is snapped onto retaining ring 76 in FIG. 16.

Thus, in the case of a center-seconds motor alone, it is not necessary to have a bar.

The invention also concerns a timepiece movement 500 including at least one such motor group 200.

The invention also concerns a watch 1000 including at least one such movement 500, and/or at least one such motor group 200.

The invention provides significant advantages:
the elimination of an equipped bar to ensure the pivoting of a single wheel;
pivoting is ensured by a single part, eliminating the risk of the arbor becoming caught if a jewel is misaligned with the center pipe;
shake on the seconds wheel is reduced, there is a two dimensional chain of tolerances, the safety height at Z is thus reduced.

The invention is particularly well suited to the fabrication of electromechanical watches or electronic watches, especially connected watches.

What is claimed is:
1. A motor group, comprising:
a plurality of motor modules, each of the plurality of motor modules including
a plate configured to secure said module to a display mechanism,
a motor configured to drive at least one display wheel set, and a center pipe fixed on said plate, said center pipe including at least a main guide bearing surface configured to guide the at least one display wheel set in rotation about a main axis, the at least one display wheel set being an outer wheel set surrounding said center pipe and being guided on the main guide bearing surface, wherein said center pipe includes at least one axial stop configured to limit an axial movement in a direction of said main axis between said center pipe and said display wheel set based on a predetermined value, said one or more axial stop includes:
  a protruding surface of said center pipe that touches said display wheel set, the protruding surface protruding in a radial direction orthogonal to the direction of said main axis; and
  a second stop surface of said center pipe, and
a relative displacement of said outer wheel set with respect to said center pipe is limited:
  by an abutting engagement between the second stop surface of said center pipe and a second upper face of said outer wheel set, and
  by an abutting engagement between a second end face of said outer wheel set and an intermediate face of said center pipe, an abutting surface being perpendicular to said main axis,
the second stop surface and the intermediate face are comprised in a same said center pipe, and
said second upper face and said second end face are comprised in a same said outer wheel set.

2. The motor group according to claim 1, further comprising
an inner wheel set guided inside said main bore of said center pipe, wherein
the at least one axial stop includes an added axial stop captively mounted between said center pipe and said display wheel set, or secured to said display wheel set,
the added axial stop includes a first ring pressed onto a first bearing surface of said inner wheel set, bearing on a first shoulder of said inner wheel set at one end of said first bearing surface, said first ring including, facing said plate, a first stop face forming a stop with respect to a first upper face of said center pipe,
said inner wheel set includes, on an opposite side to said first bearing surface with respect to said plate, a first end face being opposite to a first lower face of said center pipe, and
a relative displacement of said inner wheel set with respect to said center pipe is limited on an upper level by an abutting engagement between said first stop surface and said first upper face and, on a lower level opposite to said upper level, by an abutting engagement between said first end face and said first lower face.

3. The motor group according to claim 1, wherein
said axial stop includes a second protruding surface of said center pipe, including, facing said plate, a second end surface arranged to form a stop with respect to said second upper face of said outer wheel set, said outer wheel set includes, on an opposite side to said second upper face and as close as possible to said plate, said second end face being opposite to an intermediate face of said center pipe, and
a relative displacement of said outer wheel set with respect to said center pipe is limited on an upper level by the abutting engagement between the second stop surface and said second upper face, and, on an intermediate level located between said plate and said upper level, by the abutting engagement between said second end face and said intermediate face.

4. The motor group according to claim 1, wherein said at least one axial stop includes an added axial stop including a retaining ring, housed both inside an outer groove of said center pipe and inside an inner groove of the at least one driving wheel set.

5. The motor group according to claim 4, further comprising
an inner wheel set guided inside said main bore of said center pipe, wherein
said added axial stop is a first retaining ring housed both inside a first outer groove of said center pipe and inside a first inner groove of said inner wheel set, and
a relative displacement of said inner wheel set with respect to said center pipe is limited by an abutting engagement between said first retaining ring, on the one hand, and first lateral surfaces of inner grooves of said first outer groove and first lateral surfaces of outer grooves of said first inner groove on the other hand.

6. The motor group according to claim 4, wherein
said added axial stop is a second retaining ring housed both inside a second outer groove of said center pipe and inside a second inner groove of said outer wheel set, and
a relative displacement of said outer wheel set with respect to said center pipe is limited by an abutting engagement between said second retaining ring, on the one hand, and second lateral surfaces of inner grooves of said second outer groove and second lateral surfaces of outer grooves of said second inner groove on the other hand.

7. The motor group according to claim 2, wherein said first ring is formed by a hand pipe fitted onto said inner wheel set, resting via an end surface of the hand pipe, on said first upper face of said center pipe.

8. The motor group according to claim 7, wherein said hand pipe includes elastic lips including an end forming said end surface of the hand pipe, an inner flange of said hand pipe being snapped onto a peripheral groove of said inner wheel set.

9. A timepiece movement including at least one motor group according to claim 1.

10. A watch including the at least one movement according to claim 9.

11. The motor group according to claim 1, wherein the second stop surface is located to form a stop with respect to the second upper face of the outer wheel set.

* * * * *